(12) United States Patent
Trask

(10) Patent No.: US 8,472,129 B1
(45) Date of Patent: Jun. 25, 2013

(54) FOREARM ENGAGING TELESCOPING MICROSCOPE WITH CLAW

(76) Inventor: Lisa M Trask, Middlefield, OH (US)

( * ) Notice: Subject to any disclaimer, the term of this patent is extended or adjusted under 35 U.S.C. 154(b) by 0 days.

(21) Appl. No.: 13/442,980

(22) Filed: Apr. 10, 2012

(51) Int. Cl.
*G02B 27/02* (2006.01)

(52) U.S. Cl.
USPC ........................................................ 359/803

(58) Field of Classification Search
USPC .................................. 359/802, 803, 809, 810
See application file for complete search history.

(56) References Cited

U.S. PATENT DOCUMENTS

| 1,556,510 | A | * | 10/1925 | King ............................ 359/803 |
| 2,649,838 | A | | 9/1953 | Krause et al. |
| 4,190,322 | A | | 2/1980 | Wortley |
| 5,150,261 | A | | 9/1992 | Tsai |
| 5,218,482 | A | * | 6/1993 | Cioffi ............................ 359/802 |
| D391,073 | S | | 2/1998 | Starks |
| 6,539,632 | B2 | | 4/2003 | Anctil |
| D614,681 | S | | 4/2010 | Chan |

* cited by examiner

*Primary Examiner* — Joseph P Martinez
(74) *Attorney, Agent, or Firm* — Kyle Fletcher

(57) ABSTRACT

The forearm engaging telescoping microscope with claw is a hand tool that provides for magnification of an object resting on a ground surface while an end user is standing in an erect posture, and which does not have to bend over to view the magnified object. A telescoping hand tool includes means for engaging a forearm at a first end whereas a microscope in perpendicular arrangement extends from a second end. The telescoping hand tool can adjust in overall length to accommodate different sizes as needed of the end user. A claw is provided adjacent to the magnifying lens, and extends in an opposing direction. The forearm engaging means is comprised of a handle that is grabbed by a hand of the end user and arm braces that engage around said forearm.

18 Claims, 3 Drawing Sheets

FOREARM ENGAGING TELESCOPING MICROSCOPE WITH CLAW

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of microscopes, more specifically, a microscope that is mounted on a distal end of a forearm engaged telescoping handle, and which includes a claw adjacent to said microscope.

B. Discussion of the Prior Art

As will be discussed immediately below, no prior art discloses a telescoping hand tool that attaches to a forearm of an end user and from which a microscope is perpendicularly engaged at a distal end; wherein the telescoping hand tool enables close up magnification of an object resting upon a ground surface while said end user can view when in a standing and erect posture; wherein a claw extends on an opposing direction with respect to said microscope so as to provide a tool for prodding of said object; wherein the telescoping hand tool includes a handle that is grabbed via a hand and arm braces that are used to engage around said forearm; wherein the telescoping hand tool can adjust an overall length as needed via the end user.

The Anctil patent (U.S. Pat. No. 6,539,632) discloses a long handled toenail clipper having an attached magnifying glass. However, the magnifying glass is not used in connection with a telescoping hand tool that bengages the forearm of an end user, and which produces magnification to said end user whom is standing in an erect position when so used.

The Wortley patent (U.S. Pat. No. 4,190,322) discloses a magnifier lens that is attached to a gooseneck. However, the gooseneck is a flexsible fixture that can freely rotate, and is not a telescoping hand tool that is engaged about a forearm of an end user so as to provide magnification of an object position on a ground surface while the end user is standing upright.

The Tsai patent (U.S. Pat. No. 5,150,261) discloses a combined screwdriver and magnifying lens and handle. However, the magnifying lens is attached and encircles the handle of the screwdriver, and is not a telescoping tool that provides magnification of an object lying on a ground surface while an end user is standing upright.

The Krause et al. patent (U.S. Pat. No. 2,649,838) discloses a telescoping magnifying lens and handle. However, the device is a letter opener in which a magnifying lens extends there from, and is not a forearm engaging tool that telescopes in length and providing a magnifying lens at a distal end to provide magnification of an object resting on a ground surface while the end user is standing upright.

The Starks patent (U.S. Pat. No. Des. 391,073) illustrates an ornamental design for a visual aid cane, which does not telescope or engage a forearm.

The Chan patent (U.S. Pat. No. Des. 614,681) illustrates an ornamental design for a floor magnifier, which is not a forearm engaging, and telescoping tool for providing floor magnification.

While the above-described devices fulfill their respective and particular objects and requirements, they do not describe a telescoping hand tool that attaches to a forearm of an end user and from which a microscope is perpendicularly engaged at a distal end; wherein the telescoping hand tool enables close up magnification of an object resting upon a ground surface while said end user can view when in a standing and erect posture; wherein a claw extends on an opposing direction with respect to said microscope so as to provide a tool for prodding of said object; wherein the telescoping hand tool includes a handle that is grabbed via a hand and arm braces that are used to engage around said forearm; wherein the telescoping hand tool can adjust an overall length as needed via the end user. In this regard, the forearm engaging telescoping microscope with claw departs from the conventional concepts and designs of the prior art.

SUMMARY OF THE INVENTION

The forearm engaging telescoping microscope with claw is a hand tool that provides for magnification of an object resting on a ground surface while an end user is standing in an erect posture, and which does not have to bend over to view the magnified object. A telescoping hand tool includes means for engaging a forearm at a first end whereas a microscope in perpendicular arrangement extends from a second end. The telescoping hand tool can adjust in overall length to accommodate different sizes as needed of the end user. A claw is provided adjacent to the magnifying lens, and extends in an opposing direction. The forearm engaging means is comprised of a handle that is grabbed by a hand of the end user and arm braces that engage around said forearm.

An object of the invention is to provide a telescoping hand tool that provides magnification of an object lying on a ground surface, and which is engaged by a forearm of an end user whom is standing in an erect posture while viewing the magnified object.

Another object of the invention is to provide a telescoping handle that attach to a forearm via arm braces positioned above a handle that is grabbed via a hand.

Another object of the invention is to provide the ability to adjust the overall length of the telescoping hand tool as needed.

Another object of the invention is to provide a claw that is adjacent to the magnifying lens, and which extends in an opposing direction so as to provide a means for poking and/or prodding of said object lying on the ground surface.

These together with additional objects, features and advantages of the forearm engaging telescoping microscope with claw will be readily apparent to those of ordinary skill in the art upon reading the following detailed description of presently preferred, but nonetheless illustrative, embodiments of the forearm engaging telescoping microscope with claw when taken in conjunction with the accompanying drawings.

In this respect, before explaining the current embodiments of the forearm engaging telescoping microscope with claw in detail, it is to be understood that the forearm engaging telescoping microscope with claw is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the forearm engaging telescoping microscope with claw.

It is therefore important that the claims be regarded as including such equivalent construction insofar as they do not depart from the spirit and scope of the forearm engaging telescoping microscope with claw. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
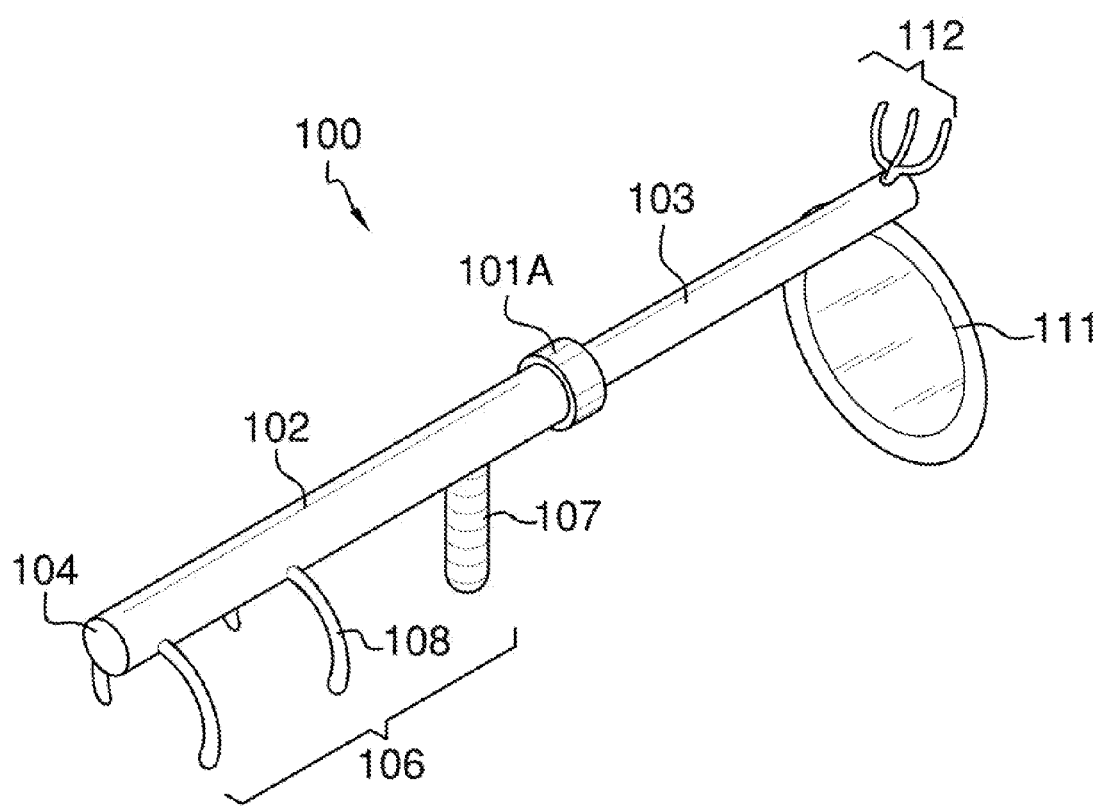
FIG. 1 illustrates a perspective view of the forearm engaging telescoping microscope with claw.
Figure 3:
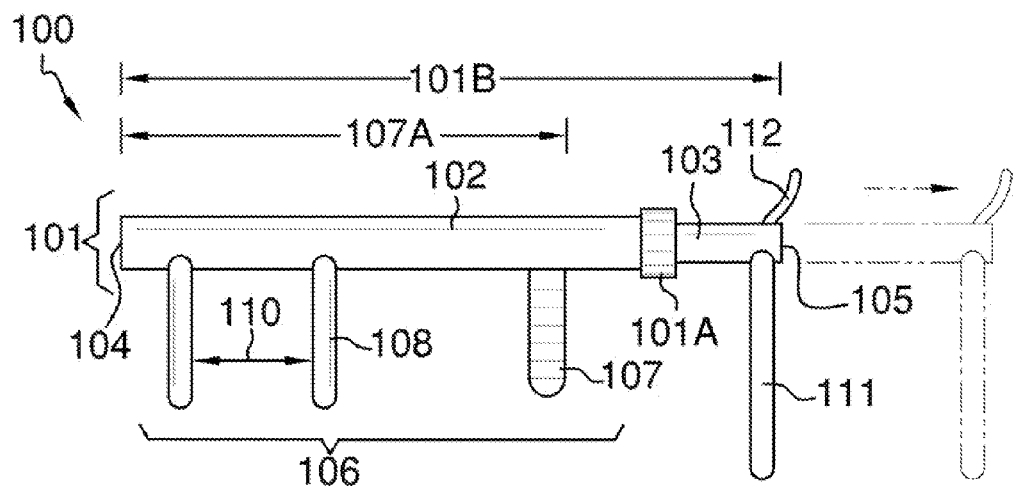
FIG. 3 illustrates a back view of the forearm engaging telescoping microscope with claw.
Figure 2:
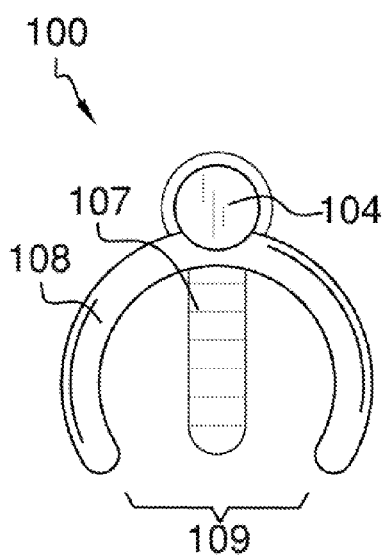
FIG. 2 illustrates a side view of the forearm engaging telescoping microscope with claw while detailing extension of the telescoping hand tool.
Figure 4:
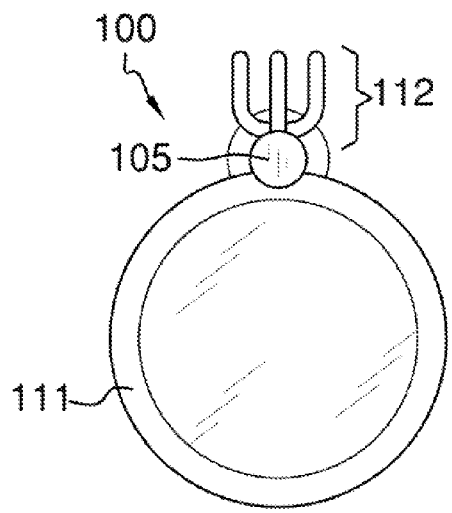
FIG. 4 illustrates a front view of the forearm engaging telescoping microscope with claw.
Figure 5:
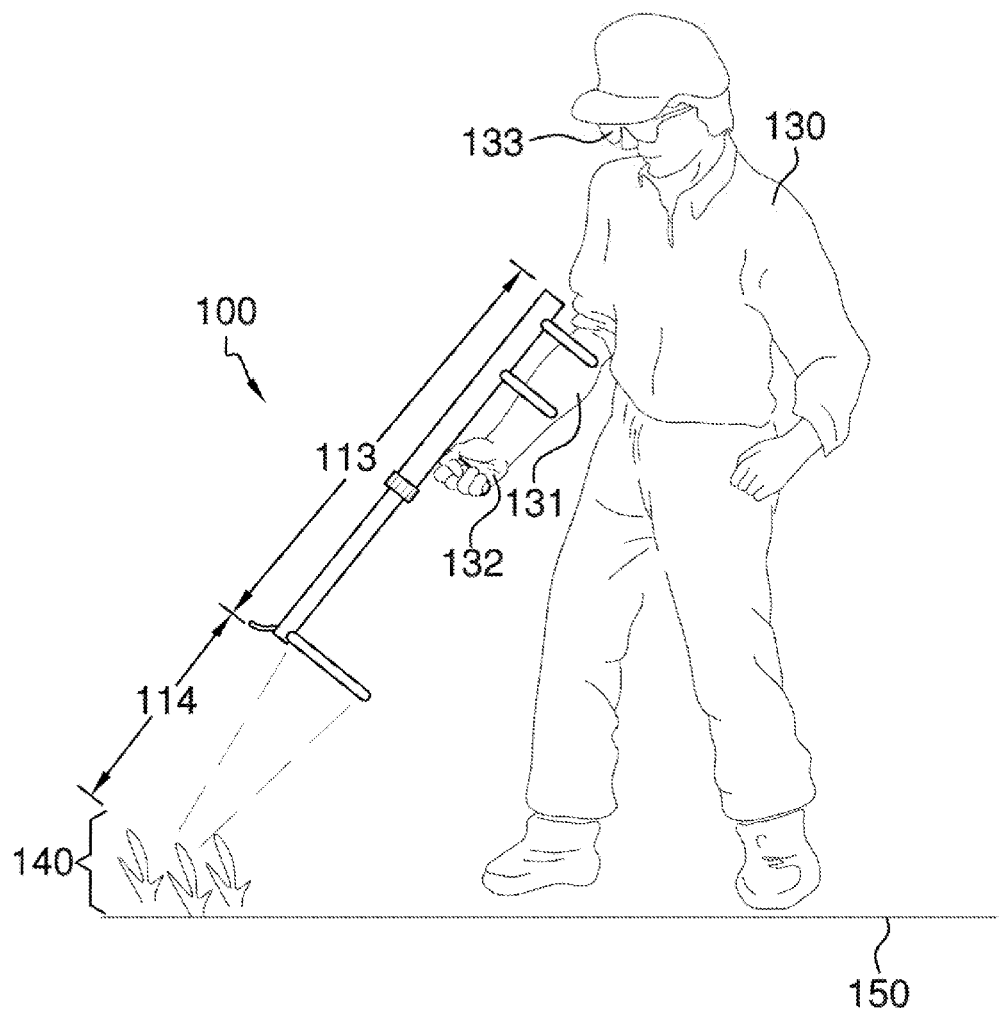
FIG. 5 illustrates a view of the forearm engaging telescoping microscope with claw in use with an end user and which depicts magnification of an object resting on the ground surface.

Detailed reference will now be made to the preferred embodiment of the present invention, examples of which are illustrated in FIGS. 1-5. A forearm engaging telescoping microscope with claw 100 (hereinafter invention) includes a telescoping hand tool 101 comprised of a first member 102 telescopically-engaged with respect to a second member 103. The telescoping hand tool 101 shall be further defined by a first end 104 and a second end 105. The first member 102 includes a forearm engaging means 106 comprised of a handle 107 and arm braces 108. The telescoping hand tool 101 shall include a threaded collar 101A positioned between the first member 102 and the second member 103, and which is responsible for tightening the first member 102 with respect to the second member 103 in order to define an overall length 101B of the telescoping hand tool 101.

The forearm engaging means 106 enables the invention 100 to be held by both a hand 132 and forearm 131 of an end user 130. Moreover, the handle 107 is positioned at a handle distance 107A from the first end 104. The arm braces 108 are closer to the first end 104, and include openings 109 within which to insert and remove the forearm 131 of the end user 130. The arm braces 108 are essentially partial circles, and are generally parallel with one another. The arm braces 108 are separated from one another via an arm brace distance 110.

The second member 103 includes a magnifying lens 111 and a claw 112 at the second end 105. The magnifying lens 111 is perpendicularly engaged with respect to the telescoping hand tool 101. Moreover, the claw 112 is adjacent to the magnifying lens 111. The claw 112 extends in an opposing direction with respect to the magnifying lens 111. The claw is also perpendicularly oriented with respect to the telescoping hand tool 101.

It shall be noted that the term magnifying lens 111 and microscope as indicated in the title are synonymous of one another, and that the magnifying lens 111 shall have a magnification ranging from that of a hand-held magnifier to a table-mounted microscope.

The claw 112 is comprised of a plurality of prongs, which are included to enable the end user 130 a means of poking and/or prodding of an object 140 that is resting upon a ground surface 150. Obviously, the magnifying lens 111 provides magnification of the object 140 resting on the ground surface 150 while enabling the end user 130 to stand erect and upright, and without the need to lean over or kneel over to see the object 140 up close. A magnifying lens distance 113 shall be defined as the distance between the magnifying lens 111 and eyes 133 of the end user 130. A lens to object distance 114 shall be defined as the distance between the object 140 and the magnifying lens 111.

It shall be noted that depending upon the magnification of the magnifying lens 111 coupled with the magnifying, lens distance 113 and lens to object distance 114 shall dictate the level of magnification of the object 140 as seen through the eyes 133 of the end user 130.

The telescoping hand tool 101, the forearm engaging means 106, the magnifying lens 111, and the claw 112 shall collectively be made of lightweight yet rugged materials that can resist the wear and tear associated with outdoor use.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A forearm engaging telescoping microscope with claw comprising:
   wherein a telescoping hand tool includes a magnifying lens and claw at a second end;
   wherein the telescoping hand tool includes forearm engaging means at a first end such that an end user shall stand upright and erect while viewing a magnification of an object resting on a ground surface.

2. The forearm engaging telescoping microscope with claw as described in claim 1 wherein the telescoping hand tool is constructed of a first member telescopically-engaged with respect to a second member.

3. The forearm engaging telescoping microscope with claw as described in claim 2 wherein the telescoping hand tool include a threaded collar positioned between the first member and the second member, and which is responsible for tightening the first member with respect to the second member in order to define an overall length of the telescoping hand tool.

4. The forearm engaging telescoping microscope with claw as described in claim 2 wherein the first member includes the forearm engaging means, and which is comprised of a handle and arm braces.

5. The forearm engaging telescoping microscope with claw as described in claim 4 wherein the handle is positioned at a handle distance from the first end; wherein the arm braces are closer to the first end when compared to the handle, and include openings within which to insert and remove the forearm of the end user.

6. The forearm engaging telescoping microscope with claw as described in claim 5 wherein the arm braces are generally parallel with one another, and are separated from one another via an arm brace distance.

7. The forearm engaging telescoping microscope with claw as described in claim 2 wherein the second member includes the magnifying lens and the claw at the second end.

8. The forearm engaging telescoping microscope with claw as described in claim 7 wherein the magnifying lens is perpendicularly engaged with respect to the telescoping hand tool; wherein the claw is adjacent to the magnifying lens.

9. The forearm engaging telescoping microscope with claw as described in claim 8 wherein the claw extends in an opposing direction with respect to the magnifying lens; wherein the claw is also perpendicularly oriented with respect to the telescoping hand tool; wherein the claw is comprised of a plurality of prongs.

10. The forearm engaging telescoping microscope with claw as described in claim 9 wherein a magnifying lens distance is the distance between the magnifying lens and eyes of the end user; wherein a lens to object distance is the distance between the object and the magnifying lens.

11. A forearm engaging telescoping microscope with claw comprising:
   wherein a telescoping hand tool includes a magnifying lens and claw at a second end;
   wherein the telescoping hand tool includes forearm engaging means at a first end such that an end user shall stand upright and erect while viewing a magnification of an object resting on a ground surface;
   wherein the telescoping hand tool is constructed of a first member telescopically-engaged with respect to a second member;
   wherein a magnifying lens distance is the distance between the magnifying lens and eyes of the end user; wherein a lens to object distance is the distance between the object and the magnifying lens.

12. The forearm engaging telescoping microscope with claw as described in claim 11 wherein the telescoping hand tool include a threaded collar positioned between the first member and the second member, and which is responsible for tightening the first member with respect to the second member in order to define an overall length of the telescoping hand tool.

13. The forearm engaging telescoping microscope with claw as described in claim 12 wherein the first member includes the forearm engaging means, and which is comprised of a handle and arm braces.

14. The forearm engaging telescoping microscope with claw as described in claim 13 wherein the handle is positioned at a handle distance from the first end; wherein the arm braces are closer to the first end when compared to the handle, and include openings within which to insert and remove the forearm of the end user.

15. The forearm engaging telescoping microscope with claw as described in claim 14 wherein the arm braces are generally parallel with one another, and are separated from one another via an arm brace distance.

16. The forearm engaging telescoping microscope with claw as described in claim 12 wherein the second member includes the magnifying lens and the claw at the second end.

17. The forearm engaging telescoping microscope with claw as described in claim 16 wherein the magnifying lens is perpendicularly engaged with respect to the telescoping hand tool; wherein the claw is adjacent to the magnifying lens.

18. The forearm engaging telescoping microscope with claw as described in claim 17 wherein the claw extends in an opposing direction with respect to the magnifying lens; wherein the claw is also perpendicularly oriented with respect to the telescoping hand tool; wherein the claw is comprised of a plurality of prongs.

\* \* \* \* \*